(12) United States Patent
Ducher (10) Patent No.: US 12,356,183 B2
(45) Date of Patent: Jul. 8, 2025

(54) WIRELESS COMMUNICATION METHOD AND SYSTEM FOR COMMUNICATION BETWEEN A DRIVER AND ANY ONE OF A PLURALITY OF TRANSPORT REFRIGERATION UNITS

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 207 days.

(21) Appl. No.: 17/751,034

(22) Filed: May 23, 2022

(65) Prior Publication Data

US 2022/0377544 A1    Nov. 24, 2022

(30) Foreign Application Priority Data

May 24, 2021    (EP) ..................................... 21175558

(51) Int. Cl.
*H04W 12/06* (2021.01)
*B60H 1/00* (2006.01)

(52) U.S. Cl.
CPC ........ *H04W 12/06* (2013.01); *B60H 1/00657* (2013.01)

(58) Field of Classification Search
USPC ................................................. 726/6; 701/2
See application file for complete search history.

(56) References Cited

U.S. PATENT DOCUMENTS

| 7,683,774 B2 | 3/2010 | Olsen et al. |
| 8,626,144 B2 | 1/2014 | Talty et al. |
| 8,731,627 B2 | 5/2014 | Inabathuni et al. |
| 9,215,590 B2 | 12/2015 | Bondesen et al. |

(Continued)

FOREIGN PATENT DOCUMENTS

| CN | 102957459 B | * 12/2016 | ............. B60R 11/02 |
| EP | 3073456 A2 | 9/2016 | |

(Continued)

OTHER PUBLICATIONS

Author Unknown, "Trailers Just Got Smarter"; Great Dane; https://greatdane.com/trailers-just-got-smarter/.

(Continued)

*Primary Examiner* — Sanchit K Sarker
(74) *Attorney, Agent, or Firm* — CANTOR COLBURN LLP (57) ABSTRACT

A method for wireless communication between a driver and any one of a plurality of transport refrigeration units 3, the method including receiving a driver identification signal at a control unit 8 of one of the transport refrigeration units, the driver identification signal being a wireless signal sent by a portable identification device 7 in the possession of the driver and uniquely identifying the driver, wirelessly transmitting status information of the transport refrigeration unit 3 from the control unit 8 to the driver, via a portable interface device 7 in the possession of the driver, and/or wirelessly receiving commands for operating the transport refrigeration unit 3 from the driver at the control unit 8, via the portable interface device 7 in the possession of the driver.

16 Claims, 4 Drawing Sheets

(56) References Cited

U.S. PATENT DOCUMENTS

| | | | |
|---|---|---|---|
| 9,251,631 B2* | 2/2016 | Thompson | B60L 1/003 |
| 9,363,841 B2 | 6/2016 | Kim | |
| 9,767,626 B2 | 9/2017 | Makke et al. | |
| 10,142,420 B2 | 11/2018 | Lei et al. | |
| 10,149,348 B2 | 12/2018 | Dieckmann et al. | |
| 10,255,606 B2 | 4/2019 | Harter et al. | |
| 10,654,339 B2 | 5/2020 | Weber et al. | |
| 10,674,361 B2 | 6/2020 | Dieckmann et al. | |
| 10,694,488 B2 | 6/2020 | Hartley | |
| 10,735,955 B2 | 8/2020 | Dieckmann et al. | |
| 10,748,353 B2 | 8/2020 | Davidson | |
| 10,930,091 B1 | 2/2021 | Son et al. | |
| 2006/0022809 A1* | 2/2006 | Lessard | B60R 25/04 340/5.8 |
| 2014/0097937 A1* | 4/2014 | Gercekci | H04W 4/80 340/5.61 |
| 2019/0130351 A1 | 5/2019 | Arena | |
| 2020/0233410 A1* | 7/2020 | Burns | B60L 50/66 |

FOREIGN PATENT DOCUMENTS

| | | |
|---|---|---|
| JP | 2020020564 A | 2/2020 |
| KR | 102201667 B1 | 1/2021 |

OTHER PUBLICATIONS

European Search Report for Application No. 21175558.2; Issued Oct. 7, 2021; 9 Pages.

Huff, Aaron, "Fleets using 'smart trailers' to protect cargo, components and profits"; Fleetworthy; Commercial Carrier Journal; Jan. 17, 2019, https://www.ccjdigital.com/business/article/14937865/smart-trailers-will-monitor-cargo-maintenance-status.

European Search Report for Application No. 21175558.2; Issued Nov. 2, 2023; 9 Pages.

* cited by examiner

WIRELESS COMMUNICATION METHOD AND SYSTEM FOR COMMUNICATION BETWEEN A DRIVER AND ANY ONE OF A PLURALITY OF TRANSPORT REFRIGERATION UNITS

FOREIGN PRIORITY

This application claims priority to European Patent Application No. 21175558.2, filed May 24, 2021, and all the benefits accruing therefrom under 35 U.S.C. § 119, the contents of which in its entirety are herein incorporated by reference.

TECHNICAL FIELD OF INVENTION

The present disclosure relates to a method for wireless communication between a driver and any one of a plurality of transport refrigeration units, and to corresponding systems for implementing the method.

BACKGROUND OF THE INVENTION

Transport refrigeration units (TRUs) transport perishable or temperature-sensitive goods and consumables within logistics networks. TRUs generally regulate a monitored environment within a storage area, such as a container or trailer, where the goods are to be stored during transit. The monitored environment is regulated using a refrigeration system or the like, which in turn is powered by an energy source such as a combustion engine and/or a battery.

TRUs are implemented or integrated within a storage container, trailer or the like. The trailer or container is then coupled with or loaded onto a truck/tractor, train or other vehicle, which transports the goods to their intended destination.

Control of a TRU is often performed by the driver of the vehicle and so, in order to ensure correct operation, the driver requires up to date information regarding the status of the TRU (e.g. the temperature inside of the TRU). Based on this information, the driver can then send commands to the TRU, for example on/off commands or commands to regulate the temperature.

One known solution for providing the driver with status information of the TRU is to send a short message to the driver's mobile phone via a cell network. However, this relies on having an accurate, up to date log/database of driver locations, associated TRUs (which the relevant driver is responsible for) and mobile phone numbers in order to ensure the correct driver (the driver responsible for the TRU in question) receives the status information. In practice, a trailer can be driven by several people in the same day and the responsibly of drivers can change at very short notice. A fleet can comprise hundreds of drivers, trucks, and trailers, resulting in a large number of possible combinations of driver, truck and trailer at any one time.

The known system of sending messages via a cell network provides no solution for such complications and last-minute changes and so is only feasible when a specific, planned driver is using the trailer in question. Therefore, there is a need for an improved system that can ensure information and/or commands are sent to/from the correct driver.

SUMMARY OF THE INVENTION

According to one aspect, the present invention provides a method for wireless communication between a driver and any one of a plurality of transport refrigeration units, the method comprising: receiving a driver identification signal at a control unit of one of the transport refrigeration units, the driver identification signal being a wireless signal sent by a portable identification device in the possession of the driver and uniquely identifying the driver, wirelessly transmitting status information of the transport refrigeration unit from the control unit to the driver, via a portable interface device in the possession of the driver, and/or wirelessly receiving commands for operating the transport refrigeration unit from the driver at the control unit, via the portable interface device in the possession of the driver.

By sending a driver identification signal from a portable identification device in the possession of the driver, that uniquely identifies the driver, it can be ensured that the correct driver is receiving status information about the TRU and/or the commands sent by the driver are received by the correct the TRU.

The status information of the transport refrigeration unit may comprise the temperature of the TRU and/or a set point temperature of the TRU.

The TRU may comprise a battery.

The status information of the transport refrigeration unit may comprise information regarding the battery. Information regarding the battery may include one or more of a temperature of the battery, power delivered from the battery and/or a state of charge of the battery. Information regarding the battery may include an indication of power supplied to the battery (i.e. for charging) and/or an indication of power supplied by the battery. Information regarding the battery may also include a comparison of battery power with power consumption of a vehicle, such as a truck.

The status information of the transport refrigeration unit may comprise an alarm or alert. The alarm or alert may warn the driver that the temperature of the TRU is inappropriate. The alarm or alert may warn the driver that the battery needs to be charged.

Journey information may also be wirelessly transmitted to the driver, and this may be via the portable interface device in the possession of the driver. Such journey information may include a start point, an end point, via points, associated timings and/or a journey route. The journey information may be transmitted from a remote server.

The commands for operating the transport refrigeration unit may comprise one or more of the following: on/off commands for the TRU; temperature set point or mode setting for the TRU; on/off commands for the battery; battery power or mode setting and charging commands for the battery.

A mode setting may be associated with a particular type of transport, for example one mode setting may be associated with long-haul distribution whilst another may be associated with city/urban distribution.

The portable identification device and the portable interface device may be the same device. One or each of devices may be a smartphone, which may comprise an app.

Alternatively the portable identification device may be an RFID tag, key fob or dongle. To uniquely identify the driver these may be associated with an ID number for the driver.

The driver identification signal may be sent when the portable identification device is within a predetermined range of the control unit. This may occur automatically, and may occur via Bluetooth or Wi-Fi. The predetermined range may be 25 m, 15 m, 5 m, 2 m, or 1 m, or even 10 cm (e.g. in the case of an RFID tag).

The status information may be wirelessly transmitted directly from the control unit to the portable interface device. This may be communicated via a Bluetooth or Wi-Fi connection between the control unit and the portable interface device.

The status information may be transmitted from the control unit to the portable interface device via a remote server. This may be performed via a cellular network. The cellular network may comprise a 3G, 4G or 5G connection, or the status information may be transmitted as an SMS message.

The method may comprise determining a location of the driver based on the driver identification signal. The driver and/or location may be associated with a particular truck, trailer and/or TRU.

The method may comprise recording said location in a database on a remote server. This can provide an up to date log of driver locations and associated trucks, trailers and/or TRUs. The driver identification signal may be communicated to the remote server where the driver is then identified based on a database comprising a list of drivers and their uniquely identifying devices.

The method may comprise transmitting the status information to a remote server and recording the status information in a database on the remote sever. This can provide a log of historic status information.

A plurality of drivers may each have a portable identification device and a portable interface device in their possession, each portable identification device uniquely identifying the respective driver, and wherein each portable identification device and each portable interface device is capable of wireless communication with any one of the plurality of transport refrigeration units. This wireless communication may be in line with the first aspect, including any of the optional features outlined above.

The method may comprise a step of authenticating the driver. This ensures correct driver is operating the TRU by sending commands, and the correct driver is receiving the status information. The authenticating may comprise at least one of: verification of a password entered by the driver into the portable identification device or the portable interface device; verifying an authority of the driver from a database containing driver authority information; or actuation by the driver of a button within the cab of a truck associated with the transport refrigeration unit.

According to a second aspect, the present invention provides a control unit for a transport refrigeration unit, the control unit configured to: receive a driver identification signal, the driver identification signal being a wireless signal sent by a portable device in the possession of a driver and uniquely identifying the driver, wirelessly transmit status information of the transport refrigeration unit to the driver, via a portable interface device in the possession of the driver, and/or wirelessly receive commands for operating the transport refrigeration unit from the driver, via the portable interface device in the possession of the driver.

The control unit may be configured for use with the method according to the first aspect, including any of the optional features discussed above.

According to a third aspect, the present invention provides a system comprising a control unit according to the second aspect and a remote server, the remote server being configured to: receive the status information from the control unit, and transmit the status information to the portable interface device, and/or receive the commands from the driver, and transmit the commands to the control unit.

The remote server may contain a real-time database of status information. The remote server may be configured to receive driver information from the control unit and may contain a real-time database of driver information. The driver information may comprise one or more of a driver ID, a driver location, an associated truck, an associated trailer and/or an associated TRU.

According to a fourth aspect the present invention provides a trailer comprising a transport refrigeration unit and a control unit according to the third aspect, the trailer being configured to attach and detach from any one of a plurality of trucks. It will be appreciated that the present invention can be applied to a fleet of trucks and trailers.

BRIEF DESCRIPTION OF THE DRAWINGS

Certain example embodiments will now be described by way of example only and with reference to the accompanying drawings in which.

DETAILED DESCRIPTION OF THE INVENTION

Figure 1:
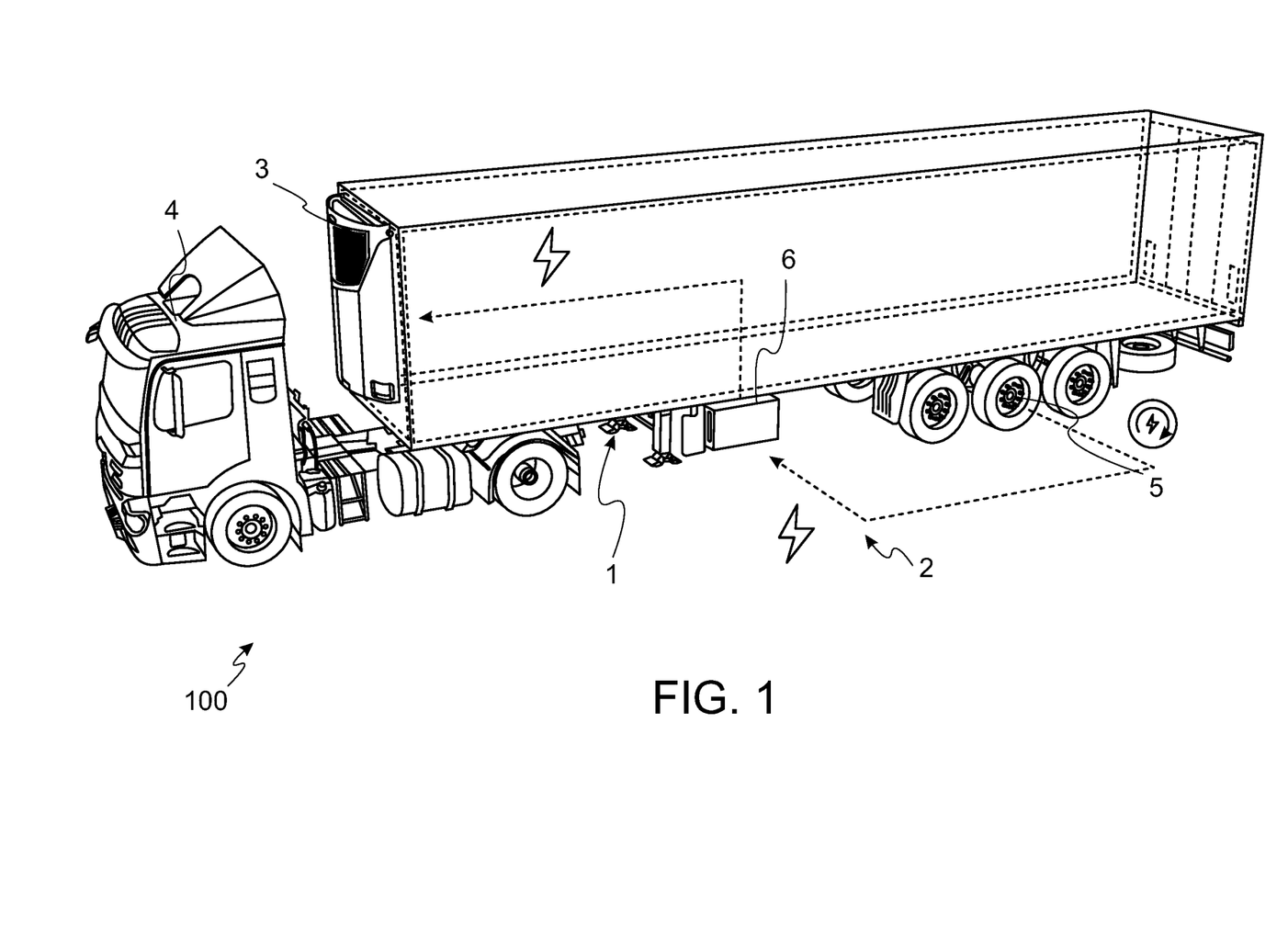
FIG. 1 shows a truck-trailer system comprising a power management system.

FIG. 1 shows a trailer 1 comprising a power management system 2 and a transport refrigeration unit (TRU) 3. The trailer 1 is part of a truck-trailer system 100. The truck-trailer system 100 comprises a truck 4, which drives the trailer 1. The trailer 1 in the illustrated embodiment does not have a means for providing a driving force itself. The truck 4 comprises an engine, such as a petrol or diesel engine. The engine produces a driving force via the combustion of fuel, which in turn drives the tractor-trailer system 100.

The tractor-trailer system 100 comprises a number of wheels, each connected to an axle. At least one of the axles is actively driven by the engine of the truck 4. The remaining axles are driven passively by the rotation of the wheels with the driving surface. Additionally, at least one of the passive axles of the trailer 1 is selectively coupled to an electrical axle generator 5.

The generator 5 is coupled to a shaft of the axle via a gearbox. The axle is configured to drive the generator 5 when the generator 5 is coupled to the axle, such that electricity can be regenerated via the rotation of the axle. Accordingly, the tractor-trailer system 100 can regenerate electricity during driving of the tractor-trailer system 100.

The TRU 3 is powered by the power management system 2. The power management system 2 is arranged to supply electrical power to the TRU 3, such that the energy demand of the TRU 3 is met. The power management system 2 comprises the generator 5 and additionally comprises an energy storage device in the form of a rechargeable battery 6. The power management system 2 supplies electrical power to the TRU 3 via the generator 5 and/or the battery 6, depending on the demand of the TRU 3, and the battery 6 can be recharged by the generator 5. The TRU 3 and the power management system 2 can be wirelessly controlled by the driver of the truck 4, as discussed in more detail below. Furthermore, the driver can receive status information about the TRU 3 and power management system 2.

Whilst the power management system 3 disclosed utilises regenerative power generation, the techniques disclosed herein are applicable to any power management system 3. For example, the generator 5 may be driven by a separate combustion engine mounted within the trailer 1.

Figure 2:
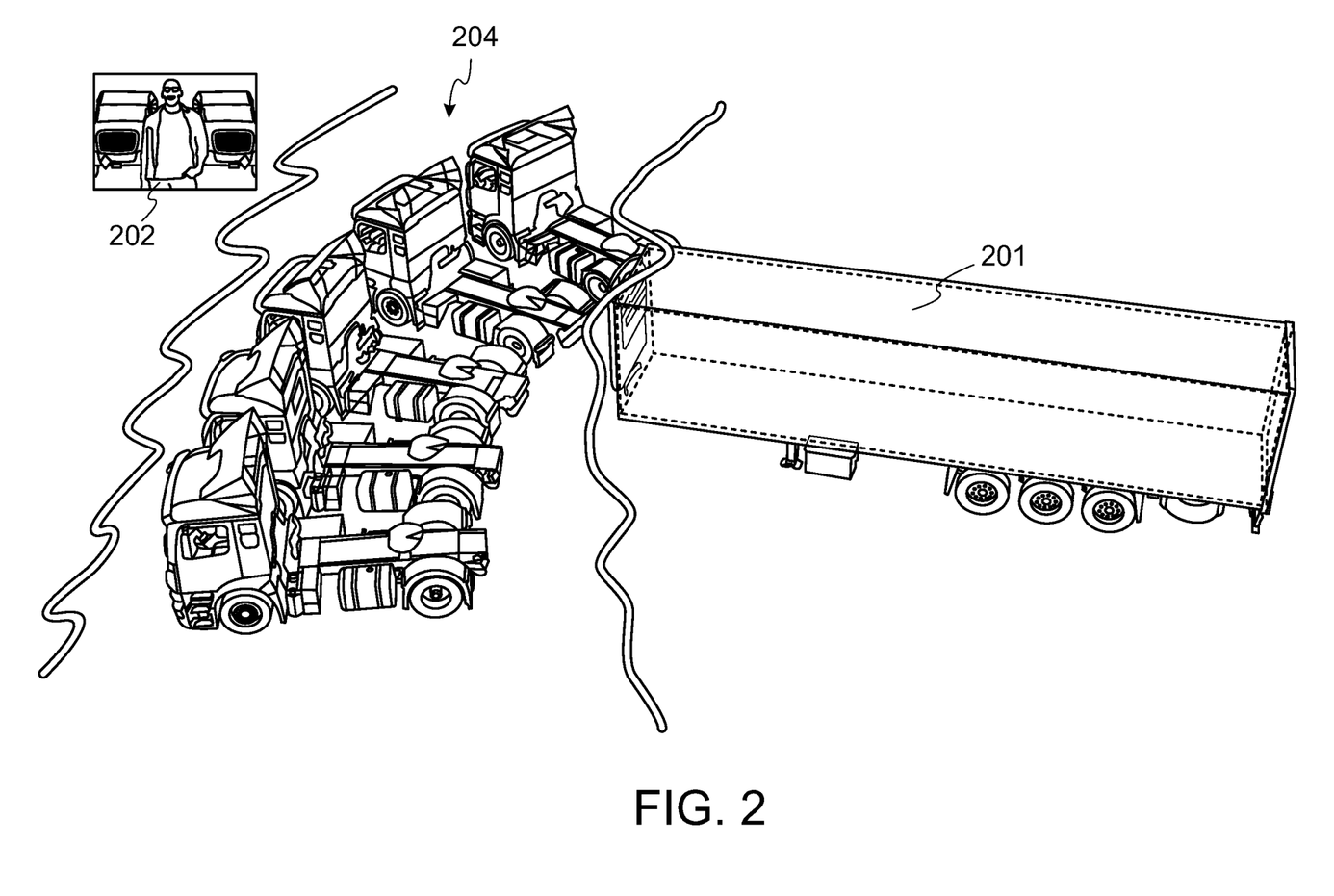
FIG. 2 illustrates a number of trucks that can be attached to an individual trailer.

As previously discussed, one known solution for providing the driver with status information of the TRU is to send a short message to the driver's mobile phone via a cell network. However, this relies on an accurate, up to date log/database of driver locations, their responsibilities for specific TRUs and mobile phone numbers in order to ensure the correct driver (the driver responsible for the TRU in question) receives the status information. In practice, a trailer can be driven by several people in the same day and the responsibly of drivers can change at very short notice. In fact, a fleet can comprise hundreds of drivers, trucks, and trailers, resulting in a very large number of possible combinations of driver, truck and trailer at any one time. FIG. 2 illustrates this complexity, showing how any truck 204 in the fleet could be attached to a trailer 201, and then any driver 202 could be responsible for the combined truck-trailer.

The known system of sending messages via a cell network provides no solution for complications in the fleet, such as last minute changes in driver, truck or trailer.

Figure 3:
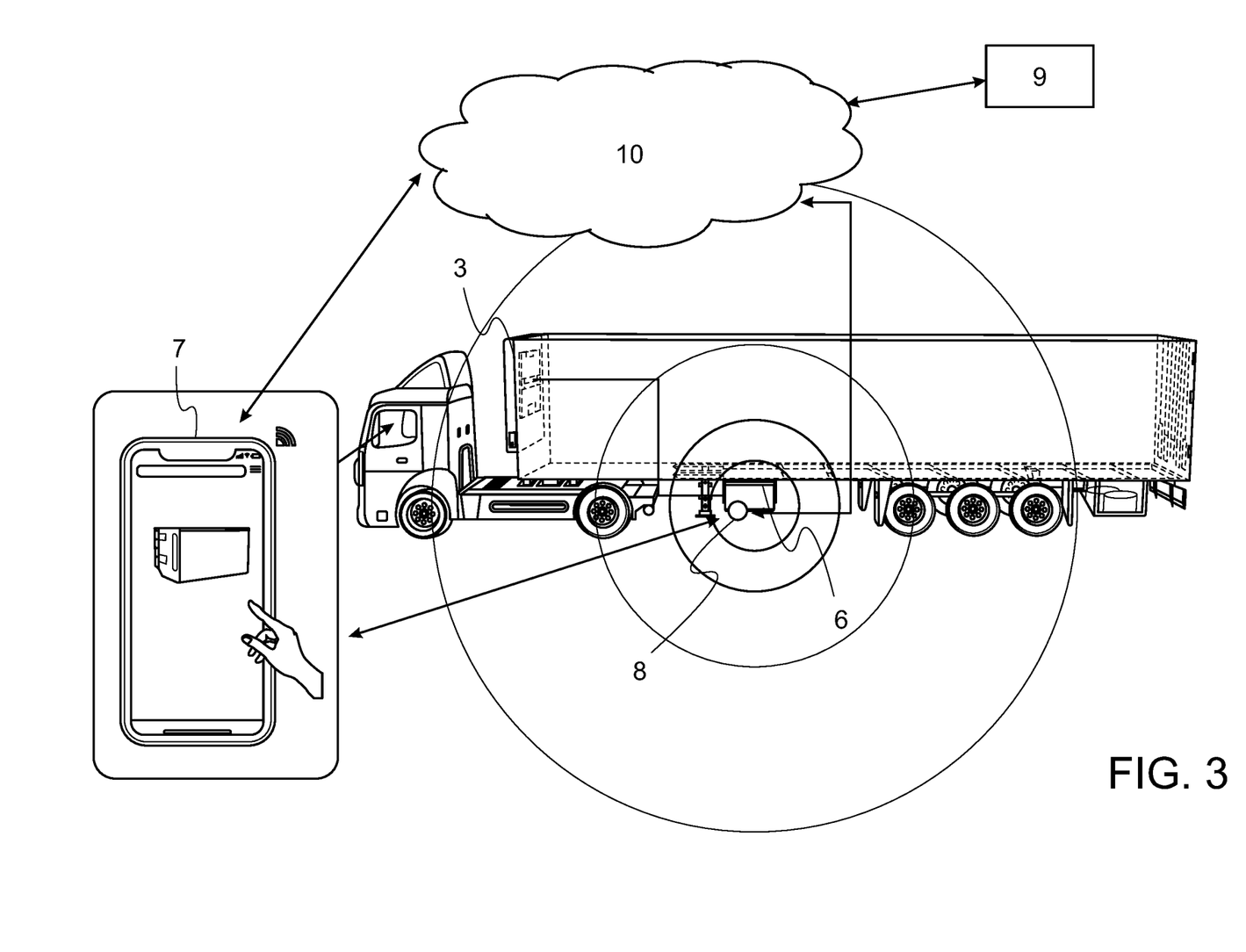
FIG. 3 shows a schematic of a first system for wireless communication between a driver and a transport refrigeration unit.

FIG. 3 shows a schematic of a system for wireless communication between a driver and a transport refrigeration unit 3.

In the possession of the driver is a smartphone 7 that is capable of wireless communication, for example via Bluetooth. The smartphone 7 also comprises an app for communication with the TRU 3. The engine management system comprises a wireless control unit 8 (e.g., a processor-based controller executing a program to perform the operations described herein), which in this embodiment is integrated into the battery 6, and this is in communication (either wired or wirelessly) with the TRU 3. It is beneficial to utilise a wireless control unit 8 integrated into the battery for this purpose as some known battery systems already comprise wireless communication units and so minimal physical adaption of the existing system is required.

In operation, when the driver approaches the trailer and comes within a predetermined range of the wireless control unit 8 (typically around 20 m), the smartphone 7 wirelessly and automatically sends a driver identification signal to the control unit 8, such as via Bluetooth. This uniquely identifies the driver to the TRU 3. The driver is then invited, via the app, to confirm their authorisation to operate the TRU 3 by entering a password associated with the TRU 3. Provided the correct password is entered, a two-way wireless communication channel is then established between the smartphone 7 and the control unit 8. The driver is then also authorised to receive status information of the transport refrigeration unit 3 from the control unit 8 and to send commands for operating the transport refrigeration unit 3 to the control unit 8, via the app of the smartphone 7.

By simply requiring the app and a password for authentication, last minute changes in driver can be accommodated by providing the new driver with the correct password.

Alternative methods of driver authentication can be employed, for example the driver may verify their identity within the app, such as by entering a personal password or presenting a biometric identifier, and an authority of the driver may then be verified from a database containing driver authority information (this database could be stored on the remote server discussed below).

A further alternative method of driver authentication may presume authorisation of the driver based on their presence within a cab of the tractor 4. For example, the driver may press or other interact with a button or the like within the cab, or may input a code only obtainable from with the cab. This works because the driver must be authorised to drive the truck in order to have access to the cab (e.g. by having the keys to the cab).

The TRU 3 may transmits status information to the control unit 8 periodically, and the control unit 8 may update the app on the smartphone 7 accordingly. Status information is collected and displayed in the app and includes the temperature of the TRU 3 and a set point temperature of the TRU (e.g. a target temperature set by the driver). Information about the battery 6 may also be collected by the control unit 8 and so the status information displayed in the app may also comprise information regarding the battery 6; such as including one or more of a temperature of the battery 6, power delivered from the battery 6 to the TRU 3 and a state of charge of the battery 6.

The app may also generate an alarm or alert, if this is necessary, such as a visible or audible alarm or alert. This may be determined either by the TRU 3 or by the app, such as when a monitored property reaches a predetermined threshold. The alarm or alert may, for example, warn the driver that the temperature of the TRU 3 is inappropriate or that the battery 6 needs to be charged.

This status information enables the driver to make informed decisions in relation to the operation of the TRU 3 and battery 6. For example, if the temperature of the TRU 3 is well below a minimum set point, or goods have been offloaded so there is no longer a need for refrigeration, and the state of charge of the battery 6 is low, the driver may decide that it is best to reduce the power supplied by the battery 6 to the TRU 3 or even turn off the TRU altogether in order to conserve the charge of the battery 6.

The driver can then send suitable commands to the control unit 8 for the operation of the battery 6 and TRU 3 via the app on the smartphone 7.

The commands may comprise any one or more of the following: on/off commands for the TRU 3; temperature set point or mode setting for the TRU 3; on/off commands for the battery 6; battery power or mode setting and charging commands for the battery 6.

In addition to being in communication with the driver's smartphone 7, the control unit 8 is also in wireless communication with a remote server 9. The control unit 8 transmits the same status information to the remote server 9 so that a detailed log of status information can be stored and kept on a database of the server. In addition the control unit 8 sends driver information to the server. This driver information includes a driver ID and location so that an up to date log of all of the drivers and trucks in the fleet can be kept—thus keeping a correct log that includes any last minute changes in drivers or trucks.

It will be appreciated that, with such a remote server 9, in the status information can be sent to the driver via the remote server 9 rather than directly from the control unit 8. This can be realised through the use of a cellular network 10 (e.g. a 3G/4G/5G network, or even an SMS messaging network). Advantageously, this may permit simpler integration with existing systems that operate in this way. It may also avoid the need for an application to be running continuously on the driver's smartphone 7. The up to date log of drivers can be utilised in this case to ensure that the correct driver (i.e. the correct mobile number) receives the status information.

Figure 4:
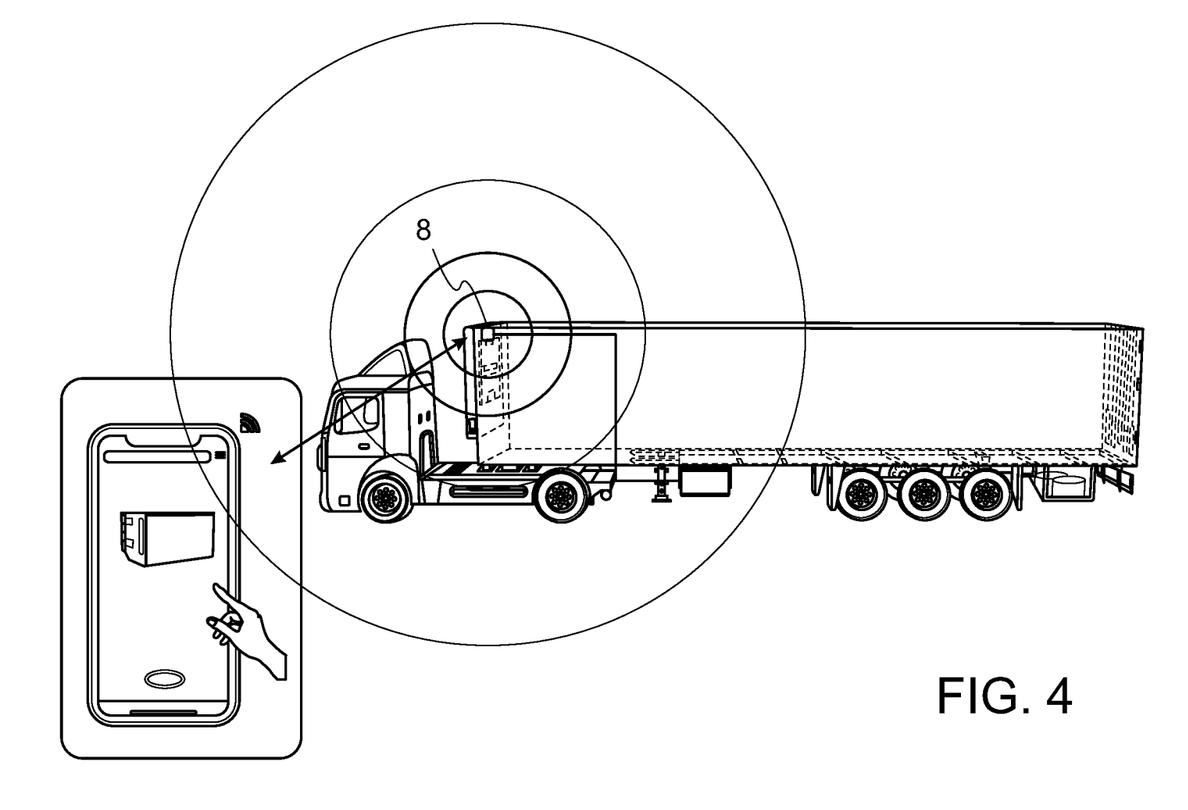
FIG. 4 shows a schematic of a second system for wireless communication between a driver and a transport refrigeration unit.

FIG. 4 shows a schematic of an alternative system that operates in a similar to that of FIG. 3. However, here the control unit 8 is integrated into the TRU 3 rather than being integrated into the battery. It will be appreciated that the exact positioning of the control unit is not limited. In fact, the control unit could even be located in the truck, provided wireless communication with the driver's smartphone is enabled as discussed above.

In a further alternative to the use of an app employing two way wireless communication as described above, a similar mode of control could be achieved by sending the driver identification to the wireless control unit 8 by a different kind device in the driver's possession (e.g. an RFID tag or dongle). The status information could be sent to a separate device such as the driver's phone, e.g. via a cellular network as discussed above, and similarly commands received from the driver's phone, e.g. via a cellular network, could be sent to the TRU 3 by the remote server 10. Thus, the status information does not necessarily need to be sent to the same device that sends the driver identification signal and/or commands.

What is claimed is:

1. A method for wireless communication between a driver and any one of a plurality of transport refrigeration units, the method comprising:
   receiving a driver identification signal at a control unit of one of the transport refrigeration units, the driver identification signal being a wireless signal sent by a portable identification device in the possession of the driver and uniquely identifying the driver;
   wirelessly transmitting status information of the transport refrigeration unit from the control unit to a remote server;
   wirelessly transmitting the status information from the remote server to the driver, via a portable interface device in the possession of the driver; and
   wirelessly receiving commands for operating the transport refrigeration unit from the driver at the control unit, via the portable interface device in the possession of the driver,
   wherein the driver identification signal is automatically sent when the portable identification device is within a predetermined range of the control unit;
   wherein the remote server contains a real-time database of status information; and
   wherein the remote server receives driver information from the control unit and contains a realtime database of driver information, the driver information comprising a driver ID and/or driver location.

2. The method as claimed in claim 1, wherein the portable identification device and the portable interface device are the same device.

3. The method as claimed in claim 1, wherein the portable identification device is a smartphone.

4. The method as claimed in claim 1, wherein the status information is transmitted to the portable interface device via a cellular network.

5. The method as claimed in claim 1, comprising determining a location of the driver based on the driver identification signal and recording said location in a database on the remote server.

6. The method as claimed in claim 1, wherein a plurality of drivers each have a portable identification device and a portable interface device in their possession, each portable identification device uniquely identifying the respective driver, and wherein each portable identification device and each portable interface device is capable of wireless communication with any one of the plurality of transport refrigeration units.

7. The method as claimed in claim 1, comprising a step of authenticating the driver prior to wirelessly transmitting the status information or wirelessly receiving the commands, wherein the authenticating comprises at least one of:
   verification of a password entered by the driver into the portable identification device or the portable interface device;
   verifying an authority of the driver from a database containing driver authority information; and
   actuation by the driver of a button within a cab of a truck associated with the transport refrigeration unit.

8. The method as claimed in claim 1, wherein the portable identification device is an RFID tag, key fob or dongle.

9. The method as claimed in claim 1, wherein the status information of the transport refrigeration unit comprises one or more of: a temperature inside of the transport refrigeration unit, a temperature of a battery of the transport refrigeration unit, a power delivered from the battery, and a state of charge of the battery.

10. The method as claimed in claim 1, wherein the status information of the transport refrigeration unit comprises an alarm or an alert to notify the driver that a temperature of the transport refrigeration unit is inappropriate or that a battery needs to be charged.

11. The method as claimed in claim 1, wherein the commands for operating the transport refrigeration unit is sent from the control unit to the transport refrigeration unit via a remote server.

12. A system comprising:
   a control unit for a transport refrigeration unit, the control unit comprising a receiver and a transmitter,
   wherein the control unit is adapted to communicate with a portable identification device in the possession of a driver to receive a driver identification signal, the driver identification signal being a wireless signal automatically sent by the portable identification device and uniquely identifying the driver when the portable identification device is within a predetermined range of the control unit; and
   a remote server,
   wherein:
   in response to the receiver receiving the driver identification signal, the control unit is adapted to wirelessly transmit status information to the remote server;
   the remote server is adapted to:
     receive the status information from the control unit; and
     in response to receiving the status information, transmit the status information to the driver, via a portable interface device in the possession of the driver;
   the control unit is adapted to wirelessly receive commands for operating the transport refrigeration unit from the driver at the control unit, via the portable interface device in the possession of the driver;
   the remote server contains a real-time database of status information; and
   the remote server is adapted to receive driver information from the control unit and contains a real-time database of driver information, the driver information comprising a driver ID and/or driver location.

13. The system as claimed in claim 12, wherein the portable identification device is an RFID tag, key fob or dongle.

14. The system as claimed in claim 12, wherein the status information of the transport refrigeration unit comprises one or more of: a temperature inside of the transport refrigeration unit, a temperature of a battery of the transport refrigeration unit, a power delivered from the battery, and a state of charge of the battery.

15. A trailer comprising:
   a transport refrigeration unit; and
   a control unit comprising a receiver and a transmitter, wherein:
      the control unit is adapted to communicate with a portable identification device in the possession of a driver to receive a driver identification signal, the driver identification signal being a wireless signal automatically sent by the portable identification device and uniquely identifying the driver when the portable identification device is within a predetermined range of the control unit;
      in response to receiving the driver identification signal, the control unit is adapted to wirelessly transmit status information of the transport refrigeration unit to a portable interface device in the possession of the driver via a remote server, the remote server containing a real-time database of status information;
      the control unit is adapted to wirelessly receive commands for operating the transport refrigeration unit from the driver at the control unit, via the portable interface device in the possession of the driver;
      the control unit is adapted to transmit driver information to the remote server, the remote server containing a real-time database of driver information, and the driver information comprising a driver ID and/or driver location; and
      the trailer is adapted to attach and detach from any one of a plurality of trucks.

16. The trailer as claimed in claim 15, wherein the portable identification device is an RFID tag, key fob or dongle.

* * * * *